United States Patent
Fauth et al.

(10) Patent No.: US 9,005,368 B2
(45) Date of Patent: Apr. 14, 2015

(54) METHOD FOR OPERATING A DISHWASHER

(75) Inventors: Michael Fauth, Pleinfeld (DE); Helmut Jerg, Giengen (DE); Kai Paintner, Adelsried (DE); Andreas Reiter, Finningen (DE); Roland Rieger, Rainau (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 1023 days.

(21) Appl. No.: 13/125,976

(22) PCT Filed: Oct. 16, 2009

(86) PCT No.: PCT/EP2009/063602
§ 371 (c)(1),
(2), (4) Date: Apr. 26, 2011

(87) PCT Pub. No.: WO2010/052117
PCT Pub. Date: May 14, 2010

(65) Prior Publication Data
US 2011/0197926 A1    Aug. 18, 2011

(30) Foreign Application Priority Data
Nov. 7, 2008 (DE) .......................... 10 2008 043 548

(51) Int. Cl.
*A47L 15/46* (2006.01)
*A47L 15/48* (2006.01)
*A47L 15/42* (2006.01)

(52) U.S. Cl.
CPC ........... *A47L 15/481* (2013.01); *A47L 15/4291* (2013.01); *Y02B 40/44* (2013.01)

(58) Field of Classification Search
None
See application file for complete search history.

(56) References Cited

U.S. PATENT DOCUMENTS

| | | | |
|---|---|---|---|
| 3,835,880 A * | 9/1974 | Hoffman et al. | 137/387 |
| 2003/0140517 A1 | 7/2003 | Schmid | |
| 2007/0234588 A1 | 10/2007 | Classen et al. | |
| 2007/0246069 A1 * | 10/2007 | Elick et al. | 134/18 |
| 2007/0295373 A1 | 12/2007 | Jerg et al. | |

(Continued)

FOREIGN PATENT DOCUMENTS

| | | |
|---|---|---|
| DE | 3901169 A1 | 7/1990 |
| DE | 19651347 A1 | 6/1998 |
| DE | 10353774 A1 | 2/2005 |

(Continued)

OTHER PUBLICATIONS

Report of Examination CN 200980144494.8 dated Sep. 18, 2013.

(Continued)

*Primary Examiner* — Michael Kornakov
*Assistant Examiner* — Ryan Coleman
(74) *Attorney, Agent, or Firm* — James E. Howard; Andre Pallapies

(57) ABSTRACT

In a method for operating a dishwasher containing wash items, in particular a household dishwasher, at least at times a heated liquid to the wash items is applied during at least two of a plurality of program steps. A desorption process for desorption of a reversibly dehydratable drying material of a sorption drying system is effected at least at times. The desorption process is carried out at least partially before or during a first of the at least two program steps, with heated liquid being applied to the wash items during the at least two program steps.

21 Claims, 4 Drawing Sheets

(56) References Cited

U.S. PATENT DOCUMENTS

| | | |
|---|---|---|
| 2008/0127997 A1 | 6/2008 | Jerg et al. |
| 2008/0149142 A1 | 6/2008 | Jerg et al. |

FOREIGN PATENT DOCUMENTS

| | | |
|---|---|---|
| DE | 10353775 A1 | 2/2005 |
| EP | 1690489 A2 | 8/2006 |
| EP | 1706015 B1 | 10/2009 |
| JP | 2006020753 A | 1/2006 |
| WO | 2006056514 A1 | 6/2006 |
| WO | 2010012716 A1 | 2/2010 |

OTHER PUBLICATIONS

International Search Report PCT/EP2009/063602.
Granting Decision of RU 2011119921 dated Feb. 28, 2014.

* cited by examiner

METHOD FOR OPERATING A DISHWASHER

BACKGROUND OF THE INVENTION

The invention relates to a method for operating a dishwasher, in particular a household dishwasher.

Dishwashers with what are known as sorption drying systems for exothermic drying of cleaned items are known from DE 103 53 774 A1, DE 103 53 775 A1 and DE 10 2005 004 096 A1. Herein, to dry washed items moist air from the interior of the dishwasher, which serves as the washing tank, is conveyed by means of a fan in a "drying" sub-program step of the respective dishwasher wash program through a sorption container, and moisture is removed by the reversibly dehydratable drying material in the sorption container from the air that has passed through it. The reversibly dehydratable drying material is heated to very high temperatures for regeneration, i.e. desorption of the drying material. Water stored in this drying material consequently exits as hot water vapor and is conveyed by an air flow generated by means of the fan into the washing tank. Liquid and/or dishes in the washing tank as well as the air therein may be heated as a result. A sorption drying system of this kind has proven to be very advantageous for drying dishes quietly and in an energy-saving manner.

BRIEF SUMMARY OF THE INVENTION

The object of the invention is to achieve an improved sorption and/or desorption result for the reversibly dehydratable drying material of the sorption drying device.

The invention starts from a method for operating a dishwasher, in particular a household dishwasher, wherein a heated liquid is applied to the wash items, at least at times, during at least two of a multiplicity of program steps, and wherein a desorption process for the desorption of a reversibly dehydratable drying material, in particular zeolite, of a sorption drying system is generated at least at times.

According to the invention it is provided that the desorption process is carried out at least partially before or during the first of the at least two program steps, during which heated liquid is applied to the wash items. Particularly efficient desorption is possible at this instant because the air inside the dishwasher is at room temperature and therefore has a high capacity for absorbing moisture, while the moisture absorbing capacity of the air is reduced during the subsequent program steps owing to heating system-induced heating.

It is provided in a development that the desorption process is carried out at least partially during a cleaning program step with the addition of cleaning agent and with cleaning action. This allows the wash items to be cleaned in a particularly energy efficient manner.

It is provided in a development that the desorption process is carried out at least partially during a pre-rinse program step with cleaning action and without the addition of cleaning agent. As a result of the heating associated therewith the cleaning action during the pre-rinse program step and therefore the wash program can be increased.

It is provided in a development that the desorption process is carried out at least partially during a rinsing program step with the addition of rinse-aid. As a result of the heating associated therewith the drying effect during the subsequent drying program step can be increased and the length of the drying program step can be reduced.

It is provided in a development that a quantity of liquid, in particular a quantity of fresh water from a domestic water supply system, is temporarily stored in a water tank that is in heat-conducting contact with the surroundings of the dishwasher. The water tank is filled after a washing program has been run through, so during the interval until a washing program is next started the quantity of water temporarily stored in the water tank can be heated, starting from a water inlet temperature of, for example 15°, to room temperature. When a washing program is run through this quantity of water heated to room temperature is used to carry out the pre-rinse washing program step. Re-filling with water from the water supply system generates corresponding cooling below room temperature.

The object of the invention is also achieved by a dishwasher, in particular a household dishwasher, designed for applying heated liquid to wash items, at least temporarily, during at least two of a multiplicity of program steps, and a sorption drying system which is designed to bring about a desorption process for the desorption of a reversibly dehydratable drying material, in particular zeolite, at least temporarily, wherein it is provided according to the invention that the desorption process can be carried out at least partially before or during the first of the at least two program steps during which heated liquid is applied to the wash items.

Developments of the inventive dishwasher are disclosed in the subclaims.

BRIEF DESCRIPTION OF THE DRAWINGS

The invention and its development will be described in more detail hereinafter with reference to the drawings, in which.

DETAILED DESCRIPTION OF EXEMPLARY EMBODIMENTS OF THE PRESENT INVENTION

Figure 1:
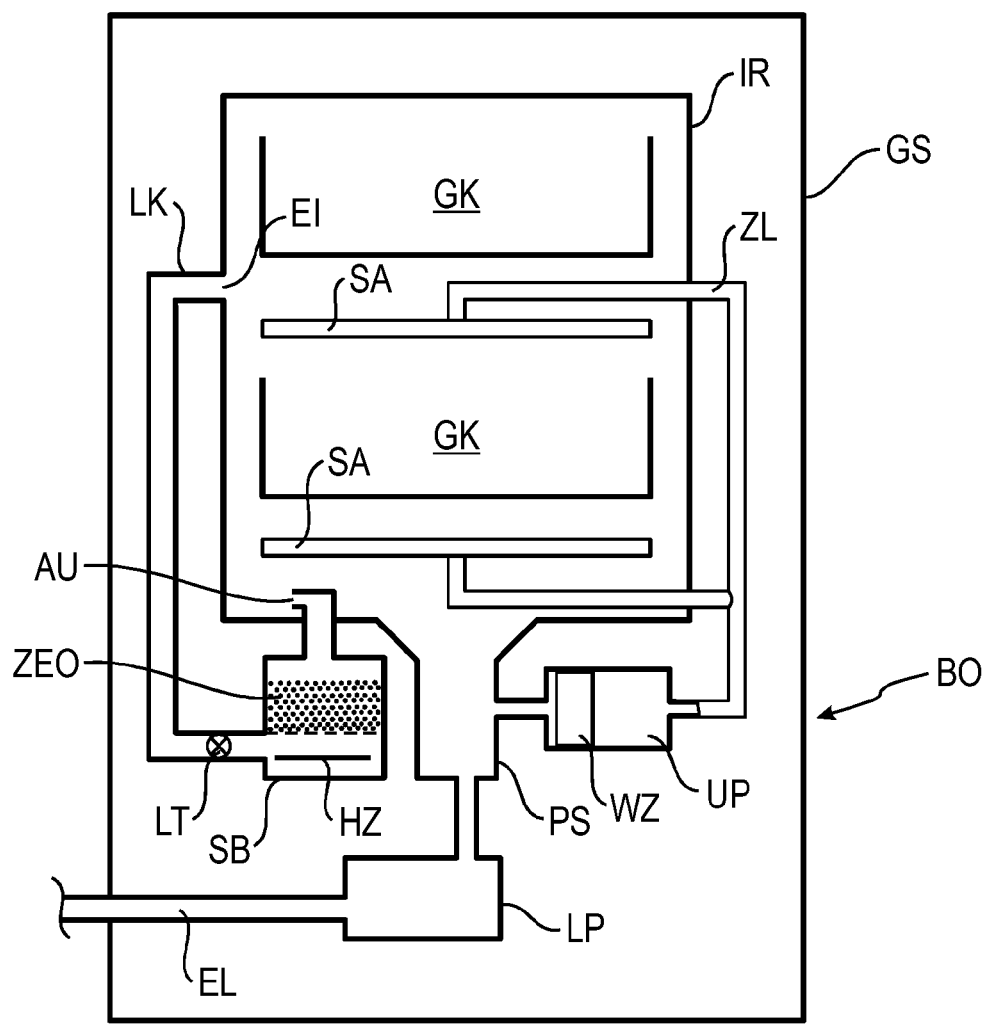
FIG. 1 shows a schematic diagram of an exemplary embodiment of an inventive dishwasher with a sorption drying system.

Reference will firstly be made to FIG. 1.

A dishwasher GS designed in the present exemplary embodiment as a household dishwasher has an interior space IR, serving as a washing tank, which can be opened and closed for loading and unloading by means of a door (not shown) pivotally hinged on the dishwasher GS. Racks GK for holding wash items are provided in the interior space IR of the dishwasher GS and can be removed from the interior space IR of the dishwasher GS to facilitate loading and unloading.

In order to clean the wash items that are stored in the racks GK means designed as spray arms SA for applying liquid to the wash items are provided in the interior space IR of the dishwasher GS, wherein the liquid can, for example, be water containing cleaning agents or rinse-aid to thus generate a cleaning action and streak-free drying. The liquid that runs off the wash items collects in a pump sump PS which is arranged in the bottom region of the interior space IR of the dishwasher GS.

The spray arms SA are connected so as to convey liquid by a supply line ZL to a circulating pump UP which, in addition to other components of the dishwasher GS, is arranged in a base module BO below the interior space IR of the dishwasher GS. During operation, i.e. when the circulating pump UP is running, the circulating pump UP sucks in the liquid that has accumulated in the pump sump PS and conveys this through the supply line ZL to the spray arms SA. To heat the liquid circulated due to operation of the circulating pump UP, the circulating pump UP has an integrated water heating system WZ for heating the liquid. Alternatively a separate continuous-flow water heater or another type of water heating system can be provided in addition to the circulating pump UP. A drain pump LP is provided for emptying the interior space IR of the dishwasher GS and this is also connected to the pump sump PS so as to convey liquid and can be connected by a discharge line EL to a domestic wastewater disposal network.

The dishwasher GS also comprises a sorption drying system with which cleaned items that are arranged in the racks GR can be dried at the end of a washing program. A sorption container SB is provided in the base module BO for this purpose and is connected, so as to convey air, by an air duct LK to an inlet El, a fan LT being provided to generate a forced flow-through. To return the air sucked in through the inlet El and conveyed by the fan LT into the sorption container back to the interior space IR of the dishwasher GS an outlet opening AU is provided in the bottom region of the interior space IR of the dishwasher GS.

To generate drying of cleaned items, air is sucked in by the fan LT from the interior space IR of the dishwasher GS, conveyed through the sorption container SB and through the outlet opening AU again and back into the interior space IR of the dishwasher GS. To dry the air circulated in the process a drying agent is provided in the sorption container SB to carry out exothermic drying. This is a reversibly dehydratable drying material, for example zeolite, which absorbs water due to its hydroscopic property, with thermal energy being liberated at the same time. This liberated thermal energy warms the circulated air, and this simultaneously increases the moisture absorption capacity of the circulated air. At the end of a drying process a quantity of liquid is stored in the drying material ZEO.

An air heating system HZ is provided to restore the absorption capacity of the drying means ZEO for another washing program run, and this is arranged in the sorption container SB in the present exemplary embodiment. However, it is also possible to arrange an air heating system outside the sorption container SB, for example in the air duct LK, to heat the air conveyed into the sorption container SB. To drive out the quantity of liquid stored in the drying material ZEO an air flow generated by the fan LT is heated, so the drying material ZEO can be heated to temperatures at which the quantity of water stored in the drying material ZEO can be liberated again.

Figure 2:
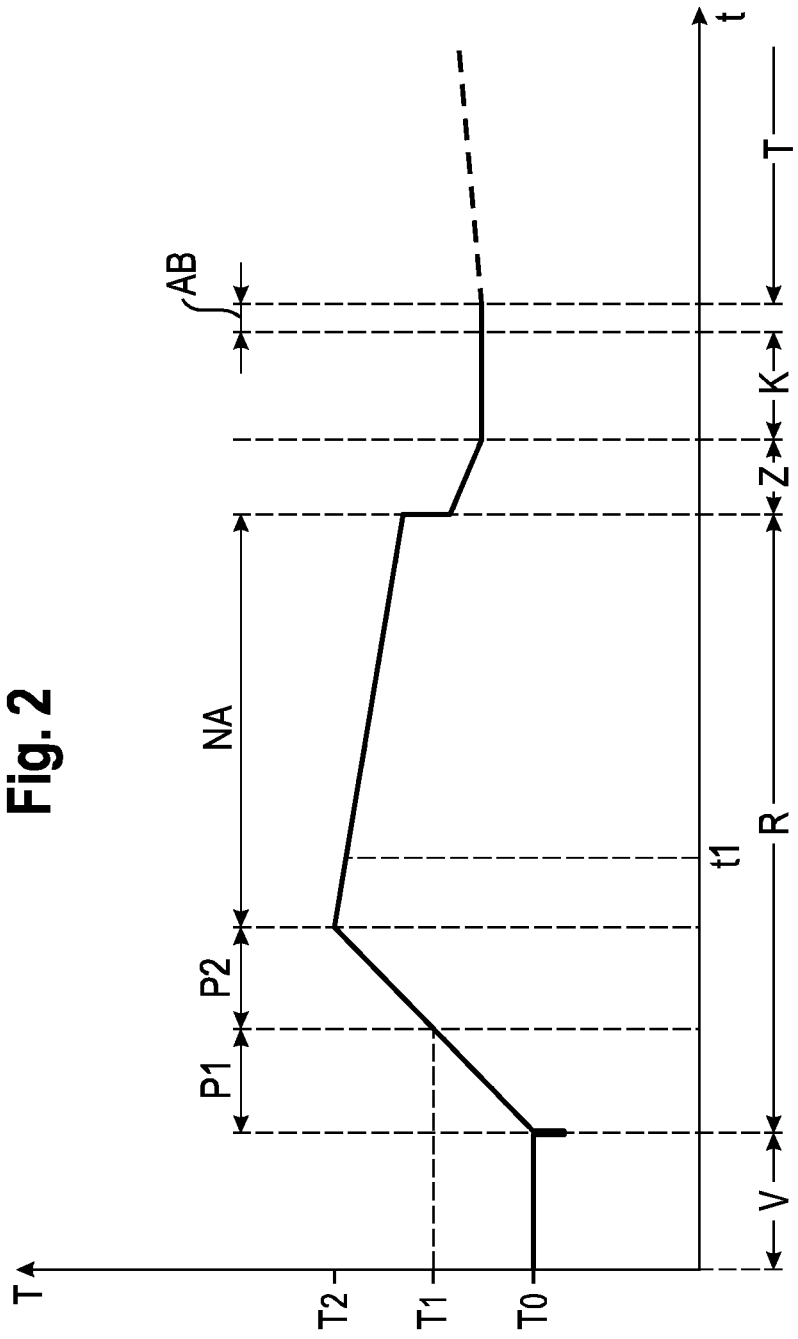
FIG. 2 shows a schematic graph of the temperature characteristic during a first exemplary embodiment of an inventive washing program run.
Figure 3:
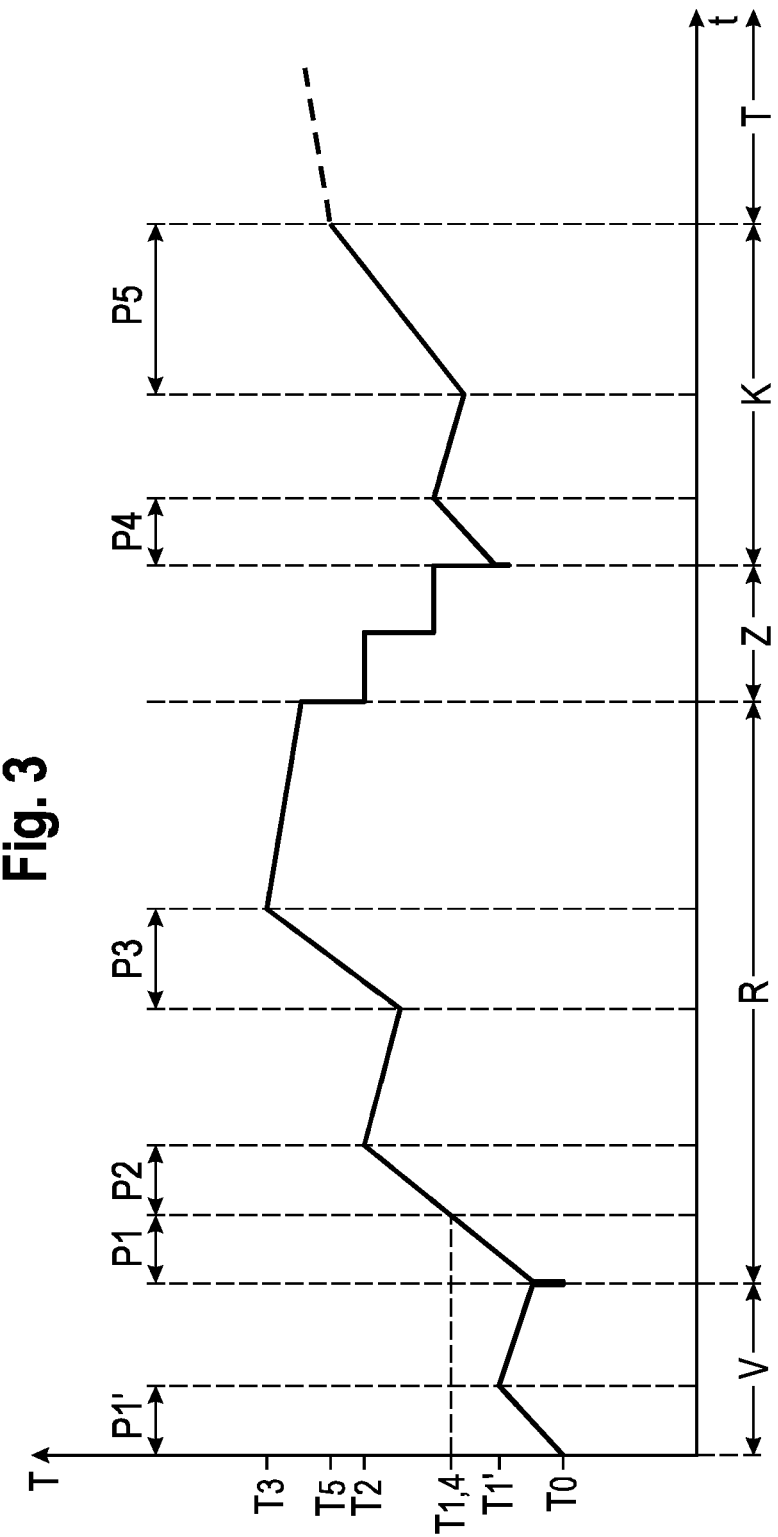
FIG. 3 shows a schematic graph of the temperature characteristic of a further, second exemplary embodiment of an inventive washing program run.
Figure 4:
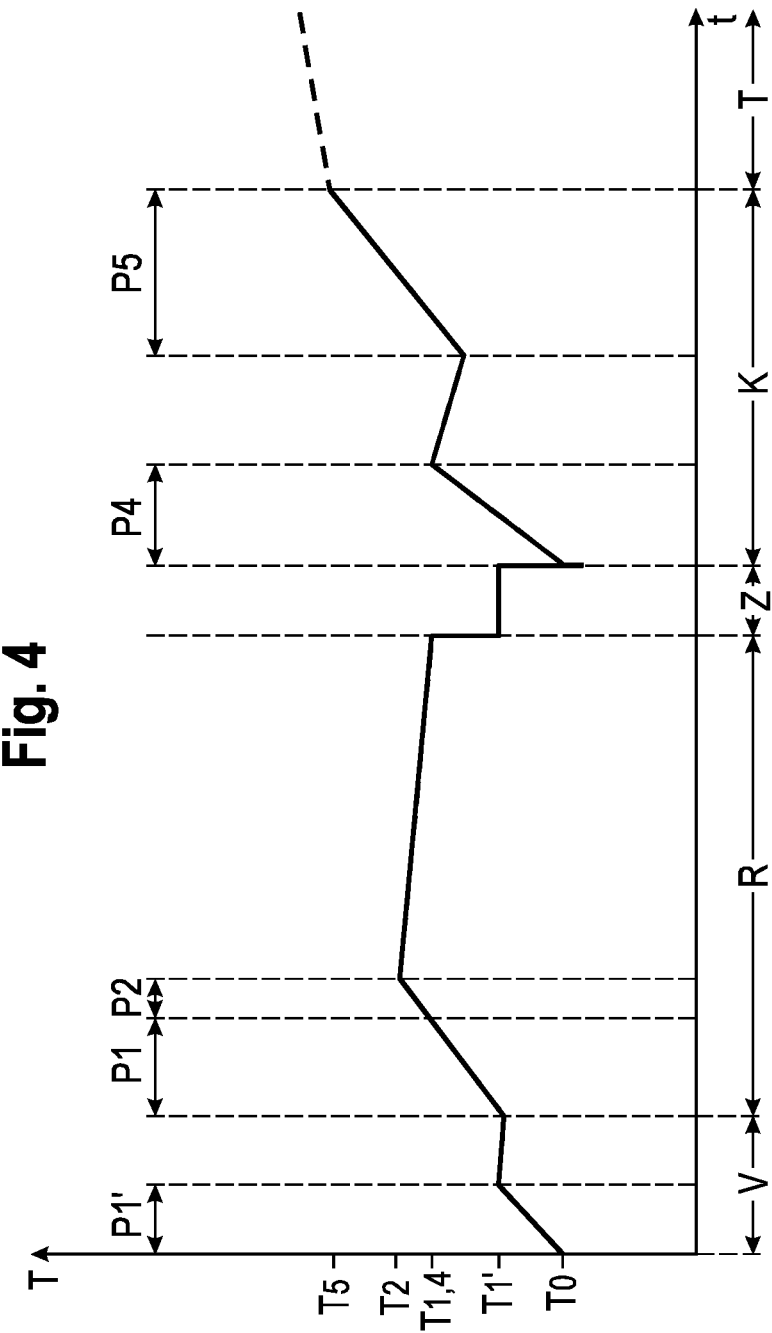
FIG. 4 shows a schematic graph of the temperature characteristic of a further, third exemplary embodiment of an inventive washing program run.

Reference will now also be made to FIGS. 2 to 4.

Dishwashers GS run through washing programs to clean and dry wash items, the programs comprising a multiplicity of program steps which are run through successively. A program of this kind can comprise the program steps pre-wash V, cleaning R, intermediate wash Z, clear rinse K and drying T, it being possible for individual program steps, such as pre-wash V or intermediate wash Z, to also be suspended, while it is also conceivable to run through individual program steps, such as intermediate wash Z, several times. During pre-wash V water without the addition of cleaning agents is applied to wash items, by way of example, with this being carried out either with water that has not been heated or with water that has been heated by means of a heating system. Water which has been stored in a water tank (not shown) can be used for this purpose. A water tank of this kind can be connected to the surroundings of the dishwasher so as to be heat-conducting, so liquid temporarily stored in the water tank, such as water from a domestic supply system, can be heated to room temperature. Wash items are cleaned in cleaning step R by applying water that contains cleaning agent, i.e. cleaning agent is added during the cleaning step. The liquid is also heated to increase the cleaning action of the cleaning agent. The cleaning step R consists of a heating phase P1, P2 in which the liquid in the dishwasher GS is heated by heating means until a specified maximum temperature is reached, and a subsequent secondary wash phase during which the slowly cooling liquid, when the heating means are switched off, is circulated by means of the circulating pump UP. In the intermediate wash Z program step liquid is applied to the wash items to thus convey residual dirt from the dishwasher GS. The next program step is clear rinse K in preparation for the drying T program step, in which water containing rinse-aid is circulated by means of the circulating pump and applied to the cleaned items by the spray arms SA. Finally the drying T program step takes place in which liquid is no longer applied to the items and instead an air flow, circulating through the interior space IR of the dishwasher GS and the sorption container SB, is generated by operation of the fan LT. The liquid can be completely or partially changed between the individual program steps, i.e. the dishwasher GS is emptied by means of the drain pump LP and discharge line EL and is refilled again by a supply line (not shown) producing a connection to a domestic supply system.

During the course of the sorption program according to FIG. 2 the liquid is only heated in the cleaning R program step. Starting from an initial temperature T0 the liquid circulated by the circulating pump UP is firstly heated by the air heating system HZ to a maximum temperature T1 in the sorption container SB during a first phase P1, an air flow, circulating through the interior space IR of the dishwasher GS, simultaneously being generated by the fan LT. The drying material ZEO in the sorption container SB is heated by the air heating system HZ to temperatures at which the quantity of water stored in the drying material ZEO is expelled from the drying material ZEO and conveyed through the outlet opening AU in the interior space IR of the dishwasher GS. This quantity of liquid is heated by the effect of the air heating system HZ and therefore brings about heating of the entire quantity of liquid in the interior space IR of the dishwasher GS due to the mixing of the liquid that has already been circulated by the circulating pump UP. Heating the liquid to the first temperature T1 by way of the air heating system HZ during the cleaning R program step ensures that the drying material ZEO can be reliably and completely desorbed due to circulation of relatively cold and dry air from the interior space IR of the dishwasher GS. Instead of a rigid washing program sequence, during which a desorption process is carried out in a first program section, in which liquid is heated, it may also be provided in an alternative exemplary embodiment that the parameters influencing the desorption process are evaluated to determine the instant for carrying out desorption. These may be the air temperature and the water intake temperature. A desorption process can, by way of example, take place in a cleaning or rinsing program step, or even, if expedient, during the pre-wash program step.

During desorbing by means of the air heating system HZ the outlet opening AU in the interior space IR of the dishwasher GS is cooled to ensure that excessive heating of the outlet opening HZ and damage due to overheating does not occur as a result of the heating output of the air heating system HZ.

For this purpose the circulating pump UP is operated during operation of the air heating system HZ, i.e. during phase P1, so liquid is conveyed by the circulating pump from the pump sump PS through the supply line to the spray arms SA. This causes the spray arms SA to rotate and due to spraying of the outlet opening AU, in particular of a cap covering the outlet opening AU, with liquid these bring about cooling thereof.

In a next phase P2 of the cleaning R program step the quantity of liquid is heated, starting from the first temperature T1 to the second temperature T2 by means of the water heating system WZ.

To improve the cleaning action during the cleaning R program step the spray pressure of the water jets issuing from the spray arm SA should be increased by increasing the speed of the circulating pump UP. For this purpose the quantity of liquid circulated by means of the circulating pump UP is increased during the cleaning R program step during the secondary washing phase NA, for example at instant t1 (cf. FIG. 2) and the speed of the circulating pump UP is subsequently increased, for example continuously, until the circulating pump runs true again, i.e. does not suck in any air bubbles during operation, which reduces the conveying capacity of the circulating pump UP and leads to undesirable noise generation. It is consequently possible to take account of the quantity of liquid liberated during desorption, which was stored in the drying material ZEO, when calculating the quantity of water for refilling and to therefore reduce the total water requirement while improving the cleaning performance.

A draining phase AB is provided between the clear rinse K program step and the drying T program step (cf. FIG. 2) during which liquid adhering to the cleaned items, i.e. water containing rinse-aid, can run off the items due to gravity and can collect in the pump sump PS of the interior space IR of the dishwasher GS. The quantity of liquid to be absorbed by the sorption drying system is reduced as a result as is the length of the drying T program step.

Before this draining phase AB, i.e. at the end of the clear rinse K program step, a pumping operation takes place in which the liquid containing rinse-aid is conveyed by means of the drain pump LP through the drain pipe EL into a domestic wastewater disposal system. The draining phase AB follows during which neither the circulating pump UP nor the drain pump LP or the fan LT or either of said heating systems HZ, WZ is operating. Once this draining phase AB is over the drying T program step begins by starting up the fan LT, so an air flow, circulating through the interior space IR of the dishwasher and the sorption container SB, is generated to dry the cleaned items in the racks GK. At the end of the drying T program step there follows another pumping operation by the drain pump LP by means of which a residual quantity of liquid is conveyed out of the dishwasher GS, through the drain pipe EL and into a domestic wastewater disposal system. Instead it may also be provided that a further pumping operation is additionally or alternatively carried out at the start of the drying T program step.

In the washing program according to FIGS. 3 and 4 liquid is heated in the first of the program steps, the pre-rinse V program step. Starting from an initial temperature T0 liquid is heated during a phase P1' by means of the air heating system HZ to a temperature T1' in which, as described above, an air flow, circulating through the interior space IR of the dishwasher GS and the sorption container SB, is generated by means of the fan LT. After reaching temperature T1', the air heating system HZ is deactivated. At this instant the drying material ZEO has still not been completely desorbed, i.e. a residual quantity of water is stored in the drying material ZEO. To expel this residual quantity of water from the drying material ZEO and therefore have a drying material ZEO that is completely water absorbent again at the start of the drying T program step, the liquid is firstly heated in the subsequent cleaning R program step by means of the air heating system HZ to a temperature T1 and subsequently heated by operation of the water heating system to temperature T2. This means the desorption phase of the drying agent ZEO in the sorption container SB is divided in two in this exemplary embodiment and is distributed over two program steps, namely the pre-wash V program step and the cleaning R program step.

To increase the cleaning action by way of a further increase in temperature an additional phase P3 (cf. FIG. 3) can be provided during which the liquid is heated further to a temperature T3 by the water heating system WZ.

To improve the drying result at the end of the drying T program step it is provided in the exemplary embodiments according to FIGS. 3 and 4 that the liquid is heated during the rinsing step K. For this purpose liquid, which is water or water containing rinse-aid, is heated during a phase P4 to a temperature T4 by means of the water heating system WZ. Alternatively the air heating system LZ may be used instead of the water heating system WZ in order, for example, to finish desorption that has not been completed during the course of the program. The liquid may also be heated further to a temperature T5 during an additional phase P5 to improve drying by the sorption drying system.

LIST OF REFERENCE CHARACTERS

AB Draining phase
AU Outlet opening
BO Base module
EI Inlet
EL Discharge line
GK Rack
GS Dishwasher
HZ Air heating system
IR Interior space
LK Air duct
LP Drain pump
LT Fan
NA Secondary washing phase
P1' Phase 1'
P1 phase 1
P2 Phase 2
P3 Phase 3
P4 Phase 4
P5 Phase 5
PS Pump sump
SA Spray arm
SB Sorption container
t1 Refilling instant
T0 Initial temperature
T1' Temperature
T1 Temperature
T2 Temperature
T3 temperature
T4 Temperature
T5 Temperature
UP Circulating pump
WZ Water heating system
ZEO Drying material
ZL Supply line

The invention claimed is:

1. A method for operating a dishwasher containing wash items, the dishwasher including a sorption drying system having a reversibly dehydratable drying material, the method comprising:
    applying at least at times a heated liquid to the wash items during at least two of a plurality of program steps,
    performing a desorption process for desorption of the reversibly dehydratable material, wherein the desorption process is divided into at least two partial desorption processes that are distributed over at least two of the plurality of program steps,
    wherein a first of the at least two partial desorption processes is performed before or during a first of the at least two program steps in which the heated liquid is applied to the wash items,
    wherein the first of the at least two partial desorption processes includes heating fluid with an air heating system,
    wherein a second of the at least two partial desorption processes includes heating fluid with the air heating system, and
    wherein the air heating system is deactivated between the first of the at least two partial desorption processes and the second of the at least two partial desorption processes.

2. The method of claim 1, wherein the reversibly dehydratable material is zeolite.

3. The method of claim 1, wherein the desorption process is carried out at least partially during a cleaning program step with addition of cleaning agent and with cleaning action.

4. The method of claim 1, wherein the desorption process is carried out at least partially during a pre-rinse program step with cleaning action and without addition of cleaning agent.

5. The method of claim 1, wherein the desorption process is carried out at least partially during a rinsing program step with addition of rinse-aid.

6. The method of claim 1, further comprising temporarily storing a quantity of liquid in a water tank that is in heat-conducting contact with surroundings of the dishwasher.

7. The method of claim 6, wherein the liquid is fresh water from a domestic water supply system.

8. The method of claim 1 for application in the operation of a household dishwasher.

9. The method of claim 1, wherein the first of the at least two partial desorption processes is performed during a pre-rinse program step, and
    wherein a second of the at least two partial desorption processes is performed during a cleaning program step that follows the pre-rinse program step.

10. The method of claim 9, wherein a third of the at least two partial desorption processes is performed during a rinsing program step that follows the cleaning program step.

11. The method of claim 1, wherein a third of the at least two partial desorption processes includes heating the fluid with the air heating system, and
    wherein the air heating system is deactivated between the second of the at least two partial desorption processes and the third of the at least two partial desorption processes.

12. The method of claim 1, further comprising:
    heating the fluid to a first temperature that is not sufficient to complete the desorption of the reversibly dehydratable material during the first of the at least two partial desorption processes; and
    heating the fluid to a second temperature that is sufficient to complete the desorption of the reversibly dehydratable material during the second of the at least two partial desorption processes.

13. The method of claim 11, further comprising:
    heating the fluid to a first temperature that is not sufficient to complete the desorption of the reversibly dehydratable material during the first of the at least two partial desorption processes;
    heating the fluid to a second temperature that is not sufficient to complete the desorption of the reversibly dehydratable material during the second of the at least two partial desorption processes; and
    heating the fluid to a third temperature that is sufficient to complete the desorption of the reversibly dehydratable material during the second of the at least two partial desorption processes.

14. A method for operating a household dishwasher, the method comprising:
    applying at least at times a heated liquid to wash items during at least two of a plurality of program steps; and
    effecting a desorption process for desorption of a reversibly dehydratable drying material of a sorption drying system in a sorption container at least at times,
    wherein the desorption process is divided in two and is distributed over a pre-wash program step and a cleaning program step,
    wherein the liquid is heated during the pre-wash program step with aid of an air heating system of the sorption drying system starting from an initial temperature TO during a phase P1' to a temperature T1' by using a fan which generates an air flow to circulate through an interior space of the dishwasher and the sorption container,
    wherein the air heating system is deactivated during a remainder of the pre-wash program step after the temperature T1' has been reached,
    wherein the liquid is heated in a following cleaning program step to a temperature T1 by the air heating system and subsequently heated to a temperature T2 by operation of a water heating system, and
    wherein the liquid is heated during a clear rinse program step.

15. The method of claim 14, wherein the reversibly dehydratable drying material is zeolite.

16. A dishwasher adapted for applying at least at times heated liquid to wash items during at least two of a plurality of program steps, the dishwasher comprising:
    a sorption drying system having a reversibly dehydratable drying material, the sorption drying system for effecting a desorption process for desorption of the reversibly dehydratable drying material,
    a control device programmed to control the sorption drying system of the dishwasher to perform the desorption process for the desorption of the reversibly dehydratable material, wherein the control device is programmed to divide the desorption process into at least two partial desorption processes that are distributed over at least two of the plurality of program steps, wherein the control device is programmed to perform a first of the at least two partial desorption processes before or during a first of the at least two program steps in which the heated liquid is applied to the wash items,
    wherein the dishwasher comprises an air heating system that is controlled by the control device, which is programmed to have the air heating system heat fluid during the first of the at least two partial desorption processes, wherein the control device is programmed to have the air heating system heat fluid during a second of the at least two partial desorption processes, and wherein the control device is programmed to deactivate the air heating system between the first of the at least two partial desorption processes and the second of the at least two partial desorption processes.

17. The dishwasher of claim 16, wherein the control device is programmed to control the sorption drying system to carry out the desorption process at least partially during a cleaning program step with the addition of cleaning agent and with cleaning action.

18. The dishwasher of claim 16, wherein the control device is programmed to control the sorption drying system to carry out the desorption process at least partially during a pre-rinse program step with cleaning action and without the addition of cleaning agent.

19. The dishwasher of claim 16, wherein the control device is programmed to control the sorption drying system to carry out the desorption process at least partially during a rinsing program step with the addition of rinse-aid.

20. The dishwasher of claim 16, further comprising a water tank in heat-conducting contact with the surroundings of the dishwasher for temporarily storing a quantity of fresh water from a domestic water supply system.

21. The dishwasher of claim 16 for use as household dishwasher.

\* \* \* \* \*